United States Patent
Islam et al.

(10) Patent No.: US 7,454,458 B2
(45) Date of Patent: Nov. 18, 2008

(54) METHOD AND SYSTEM FOR APPLICATION LOAD BALANCING

(75) Inventors: Nayeem Islam, Palo Alto, CA (US); Shahid Shoaib, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1082 days.

(21) Appl. No.: 10/179,910

(22) Filed: Jun. 24, 2002

(65) Prior Publication Data
US 2004/0003029 A1 Jan. 1, 2004

(51) Int. Cl.
G06F 15/16 (2006.01)
G06F 15/173 (2006.01)

(52) U.S. Cl. .................. 709/203; 709/224; 709/226

(58) Field of Classification Search ............... 709/201, 709/204, 220, 224, 246, 203, 226; 706/3; 705/38; 703/14; 370/231; 714/47, 48
See application file for complete search history.

(56) References Cited

U.S. PATENT DOCUMENTS

| | | | |
|---|---|---|---|
| 5,493,689 A * | 2/1996 | Waclawsky et al. ............ 710/1 |
| 5,848,234 A * | 12/1998 | Chernick et al. ............ 709/203 |
| 5,928,323 A | 7/1999 | Gosling et al. |
| 5,987,506 A * | 11/1999 | Carter et al. ................ 709/213 |
| 6,049,673 A * | 4/2000 | McComb et al. ............ 717/164 |
| 6,092,178 A | 7/2000 | Jindal et al. |
| 6,195,680 B1 | 2/2001 | Goldszmidt et al. |
| 6,324,524 B1 * | 11/2001 | Lent et al. ..................... 705/38 |
| 6,418,445 B1 * | 7/2002 | Moerbeek ............... 707/103 X |
| 6,487,607 B1 | 11/2002 | Wollrath et al. |
| 6,694,329 B2 * | 2/2004 | Murray ................... 707/103 Y |
| 6,738,813 B1 * | 5/2004 | Reichman ................... 709/224 |
| 6,738,933 B2 * | 5/2004 | Fraenkel et al. ............... 714/47 |
| 6,760,748 B1 * | 7/2004 | Hakim ...................... 709/204 |
| 6,779,016 B1 * | 8/2004 | Aziz et al. .................. 709/201 |
| 6,868,448 B1 * | 3/2005 | Gupta et al. ................ 709/226 |
| 6,920,480 B2 * | 7/2005 | Mitchell et al. ............. 709/203 |
| 6,941,341 B2 * | 9/2005 | Logston et al. ............. 709/203 |
| 7,210,099 B2 * | 4/2007 | Rohrabaugh et al. ........ 715/249 |
| 7,236,260 B2 * | 6/2007 | Ohta ......................... 358/1.15 |

(Continued)

OTHER PUBLICATIONS

"Java™ 2 Platform, Micro Edition," Sun Microsystems Datasheet, 2001.

(Continued)

*Primary Examiner*—Douglas B Blair
(74) *Attorney, Agent, or Firm*—Blakely, Sokoloff, Taylor & Zafman LLP (57) ABSTRACT

In one aspect of the invention, a method for load balancing an application among a plurality of computing devices coupled with at least one access network for communication between the devices is provided. The method comprises storing the application on a server device coupled with the access network. The method also comprises measuring a set of application attributes associated with the application, including at least one performance attribute for characterizing a user perceived performance of the application. The method further comprises issuing a request, from a client device coupled with the access network, for the application. Additionally, the method comprises provisioning execution of the application on the client or server device in response to the request based on the set of application attributes. The method further comprises executing the application on the client or server device in response to provisioning the execution of the application.

43 Claims, 6 Drawing Sheets

U.S. PATENT DOCUMENTS

| | | | |
|---|---|---|---|
| 7,240,094 B2* | 7/2007 | Hackney et al. | 709/205 |
| 7,315,885 B2* | 1/2008 | Weisshaar et al. | 709/217 |
| 2001/0047393 A1* | 11/2001 | Arner et al. | 709/216 |
| 2002/0013832 A1* | 1/2002 | Hubbard | 709/220 |
| 2002/0112036 A1* | 8/2002 | Bohannon et al. | 709/220 |
| 2002/0165900 A1 | 11/2002 | Kubo et al. | |
| 2002/0178262 A1 | 11/2002 | Bonnell et al. | |
| 2002/0188717 A1* | 12/2002 | Mushlin et al. | 709/224 |
| 2003/0048751 A1* | 3/2003 | Han et al. | 370/231 |
| 2003/0056026 A1 | 3/2003 | Anuff et al. | |
| 2003/0061017 A1* | 3/2003 | Dotaro et al. | 703/14 |
| 2003/0069974 A1 | 4/2003 | Lu et al. | |
| 2003/0088529 A1* | 5/2003 | Klinker et al. | 706/3 |
| 2003/0131075 A1 | 7/2003 | Bear et al. | |
| 2004/0205689 A1* | 10/2004 | Ellens et al. | 717/100 |
| 2004/0215829 A1* | 10/2004 | Hubbard et al. | 709/246 |
| 2005/0028171 A1* | 2/2005 | Kougiouris et al. | 719/318 |
| 2006/0143239 A1* | 6/2006 | Battat et al. | 707/201 |

OTHER PUBLICATIONS

"Java™ 2 Platform, Micro Edition (J2ME™ Platform)," http://java.sun.com/j2me/.

"Java™ 2 Platform, Micro Edition," http://java.sun.com/j2me/fag.html.

"What is Java™ Technology," http://java.sun.com/java2.

"Java™ 2 Enterprise Edition J2EE™) Platform," http://developer.java.sun.com/developer/products/j2ee/.

"JavaServer Pages™ Dynamically Generated Web Content," http://java.sun.com/products/jsp.

"JavaServer Pages™ Key Features," http://java.sun.com/products/jsp/keyfeatures.html.

"JavaServer Pages™ Frequently Asked Questions," http://java.sun.com/products/jsp/fag.html.

"JavaServer Pages™ White Paper," http://java.sun.com/products/jsp/whitepaper.html.

"JavaServer Pages™ Tomcat@ Jakarta," http://java.sun.com/products/jsp/tomcat/.

"Tomcat," http://java.sun.com/products/javamail/Tomcat.html.

"3.3.3 The Web Container," http://java.sun.com/blueprints/guidelinesdesigning_enterprise_applications_2e_draft/web-tier11.html.

"Java™ Message Service Tutorial," http://java.sun.com/products/jms/tutorial/.

"JavaBeans™," http://java.sun.com/products/javabeans/.

"Java™ Servlet Technology, The Power Behind the Server," http://java.sun.com/products/servlet/.

"Java Accessibility, The Pluggable Look And Feel," http://java.sun.com/products/jfc.jaccess-1.1/doc/pluggable/html.

"Java™ Foundation Classes (JFC)," http://java.sun.com/products/jfc/.

"Java AWT Imaging," http://java.sun.com/products/java-media/jai/forDevelopers/jai1_0_1guide-unc/J2D-concepts.doc.html.

"Java Bookshelf, java Developer Connection™, Chapter 3 Graphics from Graphic Java 1.2, vol. 1—AWT," http://developer.java.sun.com/developer/Books/Graphics/index.html.

"Common Language Runtime Introduction and Overview," Microsoft for Partners, http://www.microsoft.com/partner/products/microsoftnetCLRTechPage.asp.

"Java Guru: What is the J2ME?," http://www.jguru.com/fag/view.jsp?EID=142831.

"High-Tech Dictionary Definition—No Frames, definition 'tag'," http://www.computeruser.com/resources/dictionary/noframes/nf.definition.html?bG9va3VV.

"High-Tech Dictionary Definition—No Frames, definition 'API'," http://www.computeruser.com/resources/dictionary/noframes/nf.definition.html?bG9va3VwPTEvMjI=.

"High-Tech Dictionary Definition—No Frames, definition 'URI'," http://www.computeruser.com/resources/dictionary/noframes/nf.definition.html?bG9va3VwPTEyMjI=.

"High-Tech Dictionary Definition—No Frames, definition 'URL'," http://www.computeruser.com/resources/dictionary/noframes/nf.definition.html?bG9va3VwPTEyMjI=.

"Technical Overview of the Common Language Runtime," Meijer, Erik and Gough, John (undated).

Distributed Systems, (pp. 40-58; 399-401); Mullender, Sape, Editor; ACM Press, 1993.

Introductory Engineering Statistics (pp. 80-85), Guttman, Irwin, Wilks, S.S., & Hunter, J. Stuart; John Wiley & Sons, Inc., 1965.

Java in a Nutshell—Fourth Edition (pp. 328-415); Flanagan, David; O'Reilly & Associates, Inc., Mar. 2002.

JAVA™ 2 Platform, Enterprise Edition (pp. 12-45); Shannon et al., Sun Microsystems, Addison-Wesley, 2000.

Designing the User Interface—Third Edition (pp. 71-80), Schneiderman, Ben, Addison Wesley Longman, Inc., 1998.

"Agile Application-Aware Adaptation for Mobility," Noble et al., School of Computer Science, Carnegie Mellon University, 1997.

"Rover: A Toolkit for Mobile Information Access," Joseph et al., M.I.T. Laboratory for Computer Science, Cambridge, MA, 1995.

"Using Latency to Evaluate Interactive System Performance," Endo et al., Second Symposium on Operating Systems Design and Implementation (OSDI), 1996.

"A Flexible Security System for Using Internet Content," Islam et al., IEEE Software, Sep./Oct. 1997.

* cited by examiner

| Performance Attributes | Description | Dimension |
|---|---|---|
| A(W), A(C), A(S) | Mean wait, communication and computation time | W and C per app, per device, per access network OR per user, per app, per device, per access network |
| V(W), V(C), V(S) | Variation of wait, communication and computation time | W and C per app, per device, per access network OR per user, per app, per device, per access network |
| TotalTime | Total time in application | per app per access network OR per user per app per access network |
| DTP | Data IO rate | per app or per user per app |
| D | Time in Data IO | per app or per user per app |
| Comp | Time in computation during request processing | per app or per user per app |
| Service time for a request | D + Comp | |
| System Attributes | | |
| U | CPU utilization | |
| NB(a) | Bandwidth on access network a | |
| NL(a) | Latency on access network a | |
| NU(a) | Network status up or down | |
| MIPS rating | | |
| Memory | | |
| Persistent storage | | |

METHOD AND SYSTEM FOR APPLICATION LOAD BALANCING

RELATED APPLICATION

This application is related to application Ser. No. 10/179,929, entitled "Mobile Application Environment," naming as inventors Nayeem Islam and Shahid Shoaib, filed the same date as the present application. That application is incorporated herein by reference for all purposes as if fully set forth herein.

FIELD OF THE INVENTION

The present invention relates generally to a system and method for load balancing an application in a network. In particular, it relates to load balancing an application to optimize response times of user interface events for the application.

BACKGROUND

The need for mobile computing and network connectivity are among the main driving forces behind the evolution of computing devices today. The desktop personal computer (PC) has been transformed into the portable notebook computer. More recently, a variety of handheld consumer electronic and embedded devices, including Personal Digital Assistants (PDAs), cellular phones and intelligent pagers have acquired relatively significant computing ability. In addition, other types of mobile consumer devices, such as digital television settop boxes, also have evolved greater computing capabilities. Now, network connectivity is quickly becoming an integral part of these consumer devices as they begin speaking with each other and traditional server computers in the form of data communication through various communication networks, such as a wired or wireless LAN, cellular, Bluetooth, 802.11b (Wi-Fi) wireless, and General Packet Radio Service (GPRS) mobile telephone networks.

The evolution of mobile computing devices has had a significant impact on the way people share information and is changing both personal and work environments. Traditionally, since a PC was fixed on a desk and not readily movable, it was possible to work or process data only at places where a PC with appropriate software was found. Nowadays, however, the users of mobile computing devices can capitalize on the mobility of these devices to access and share information from remote locations at their convenience.

The first generation mobile devices typically were request-only devices or devices that could merely request services and information from more intelligent and resource rich server computers. The servers used standard software architectures, such as the Java 2 Enterprise Edition (J2EE) platform. The server platforms define and support a programming model that allows thin-client applications to invoke logic instructions that execute on the servers.

Today, with the advent of more powerful computing platforms aimed at mobile computing devices, such as PocketPC and Java 2 Platform, Micro Edition (J2ME), mobile devices have gained the ability to host and process information and to participate in more complex interactive transactions. In order to capitalize on the mobility of these more powerful computing systems, developers have created mobile applications that may have been server-based in the past, but which can now be distributed on various mobile devices in a network. In other words, when a user interacts with a mobile device and requests a mobile application, either the mobile device or a remote server class machine may be capable of executing the application and meeting the request.

However, mobile computing systems pose several challenges for application developers. For example, mobile devices typically have more limited hardware resources than conventional server computers. In addition, mobile devices tend to have widely varying hardware configurations, including differences in computation power, memory size, display capability, means for inputting data, etc. Mobile communication networks also experience limited network bandwidth and network availability, and mobile devices may be connected, intermittently connected or disconnected from a network.

A popular platform for implementing mobile applications is the Java platform. It allows the same Java application to run different kinds of computing devices without operating system or hardware compatibility issues. Java is a programming language and Java programs are compiled into high-level machine independent bytecodes, which are then interpreted to run by a Java virtual machine. Since Java programs are machine independent, they run on different hardware platforms without the need to perform any special porting modifications for the programs.

However, known mobile application environments fail to intelligently exploit the resources available to mobile devices and servers to shield mobile applications from the limitations of mobile computing environments and to improve their performance. Therefore, a method is needed to determine where to run a mobile application in a network and, if multiple access networks are available, which network to use for communication between a requesting mobile device and a server that is configured to offer the requested application in order to optimize the performance of the mobile application.

SUMMARY

In one aspect of the invention, a method for load balancing an application among a plurality of computing devices coupled with at least one access network for communication between the devices is provided. The method comprises storing the application on a server device coupled with the access network. The method also comprises measuring a set of application attributes associated with the application, including at least one performance attribute for characterizing a user perceived performance of the application. The method further comprises issuing a request, from a client device coupled with the access network, for the application. Additionally, the method comprises provisioning execution of the application on the client or server device in response to the request based on the set of application attributes. The method further comprises executing the application on the client or server device in response to provisioning the execution of the application.

In another aspect of the invention, a system for load balancing an application forming part of at least one network is provided. The system comprises a plurality of execution modules coupled with the network that provide different execution environments for the application. The system also comprises at least one collection module coupled with the network that measures a set of application attributes associated with the application. The application attributes include at least one performance attribute for characterizing user perceived performance of the application. The system further comprises at least one policy module coupled with the network that, based on the application attributes, determines a first execution module that satisfies at least one policy for determining an execution environment of the application. In addition, the system comprises at least one program allocation module that allocates the application on the first execution module.

In yet another aspect of the invention, a system for load balancing an application among a plurality of computing devices coupled with at least one access network for communication between the devices is provided. The system comprises a means for storing the application on a server device coupled with the access network. The system also comprises a means for measuring a set of application attributes, including at least one performance attribute for characterizing a user perceived performance of the application. The system further includes a means for issuing a request, from a client device coupled with the access network, for the application. In addition, the system comprises a means for provisioning execution of the application on one of the server device and client device in response to the request based on the set of application attributes. The system further includes a means for executing the application on the one of the client and server devices in response to the provisioning of the execution of the application.

BRIEF DESCRIPTION OF THE DRAWINGS

The accompanying drawings, which are incorporated in and constitute a part of this specification, illustrate embodiments of the invention and, together with the description, serve to explain the advantages and principles of the invention. In the drawings.

DETAILED DESCRIPTION OF THE PREFERRED EMBODIMENTS

Reference will now be made in detail to an implementation of the present invention as illustrated in the accompanying drawings. The preferred embodiments of the present invention are described below using a Java based software system. However, it will be readily understood that the Java based software system is not the only vehicle for implementing the present invention, and the present invention may be implemented under other types of software systems.

1. Overview

When users interact with a mobile client device in a network to request information from a mobile application, the response time for user interface events significantly affects the user perceived performance of the system. In particular, the statistical mean and variance of wait times of user interface events are key measures of the user perceived performance. According to an embodiment of the present invention, a mobile application is load balanced to optimize its user perceived performance using a unique set of attributes that characterize the user interface for the application using measured wait times for user interface events.

This approach to load balancing for mobile applications leads to at least two types of optimizations using a large class of algorithms: application provisioning and network switching. The application provisioning optimization determines whether to dynamically relocate an application among devices in a communication network. The network switching optimization determines whether to switch access networks for communications to and from an application and a client device. Application load balancing may be performed at application load time and runtime to improve the user perceived behavior of the system.

Figure 1:
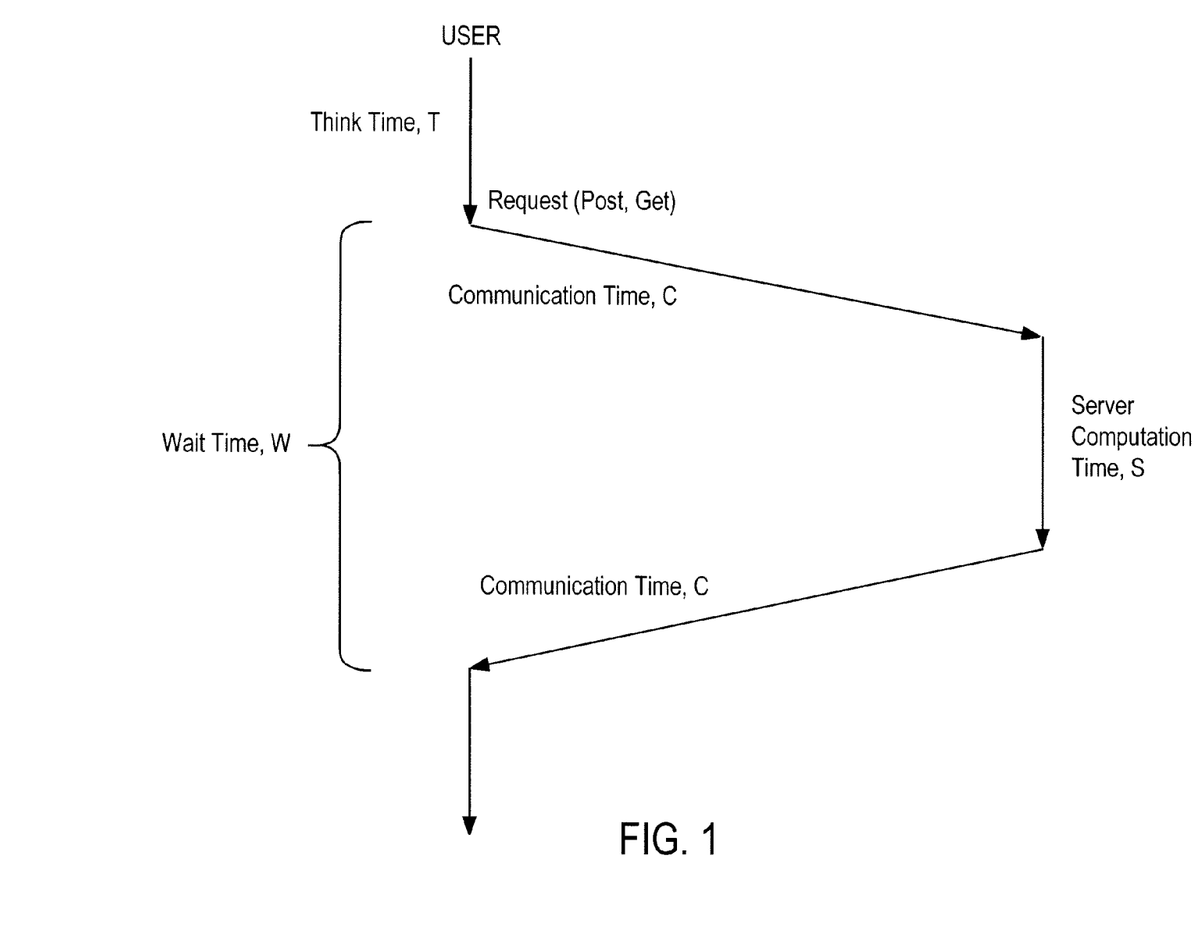
FIG. 1 is a block diagram showing a timeline for user interface events of a mobile application.

In order to explain the performance optimization made possible using the load balancing scheme according to the present invention, a timeline for user interface events on a client device is shown in FIG. 1. A user moves through alternate think times T and wait times W during user interactions with an application. At the end of each think time T, the user sends a request to the application and waits for a reply. The application typically waits in a loop for requests from the user. On receiving a request, the application may perform computations and access data to fulfill the user's request. It will then send back the reply. The timeline shown in FIG. 1 completes one such interaction.

The wait time W is the time associated with processing a request. The wait time can be broken down into communication time C and server computation time S. Typically, user experience is based on the mean and variance of the wait times when interacting with the application. Therefore, the performance of an application can be optimized if its wait times are generally below a predetermined threshold value. The load balancing scheme according to the present invention can optimize the wait times for an application by relocating the application from a server closer to the user or switching the access network between the user client device and the server machine.

Figure 2:
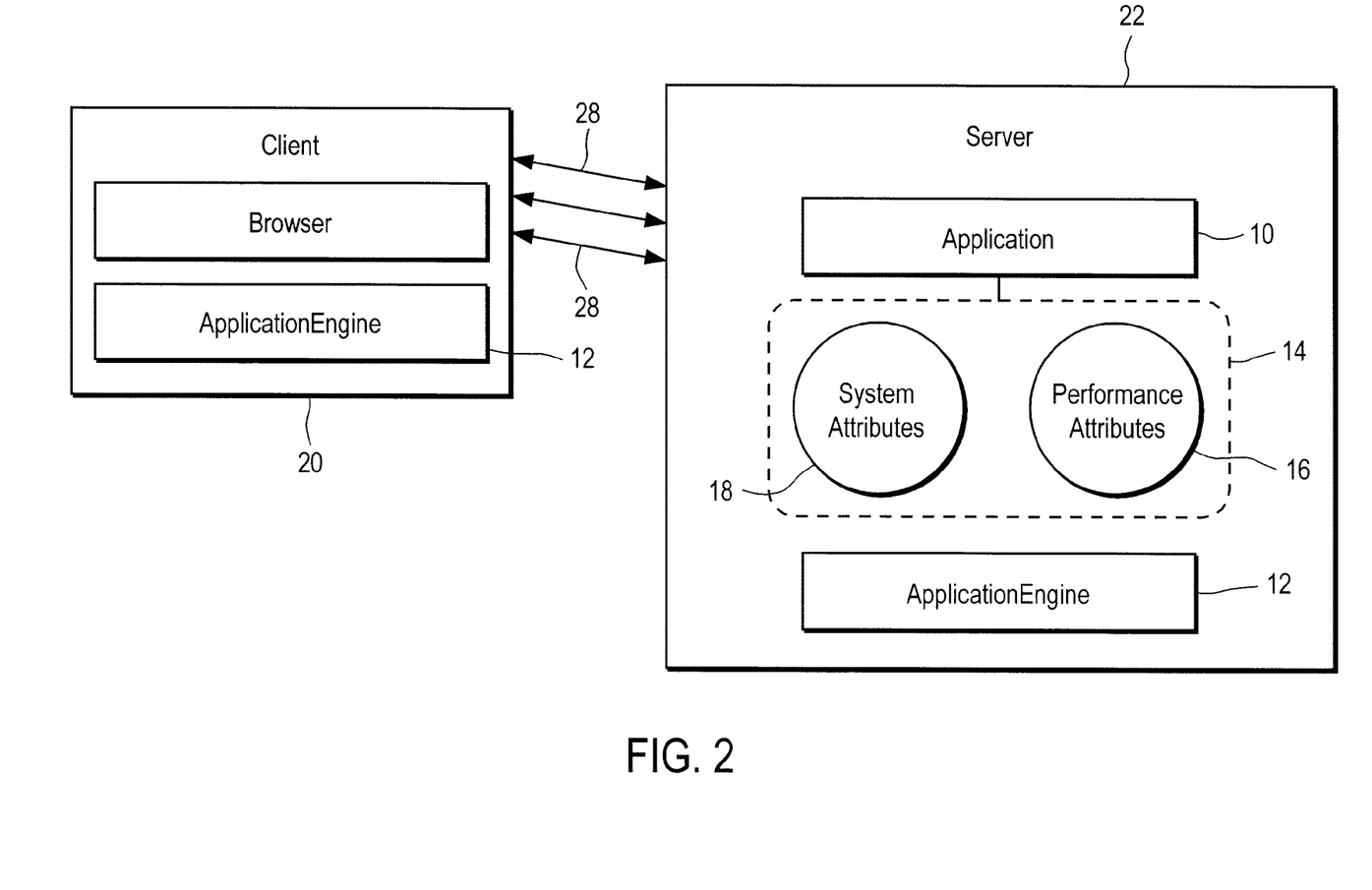
FIG. 2 is block diagram showing an illustrative mobile computing system in which a mobile application can be load balanced according to the present invention.

An illustrative mobile computing system in which an embodiment of the invention may be implemented to load balance a mobile application is shown in FIG. 2. A user interacts with mobile client device 20 to request an application 10. The mobile application 10 may be stored locally on a requesting mobile client device 20 or on a remote node in the network with sufficient memory and processing capacities to execute the application ("server") 22, which may be another mobile client device or a server class computer machine. The client 20 and the server 22 may communicate over one or more access networks 28.

The client 20 may or may not be capable of executing the application 10, depending on its hardware resources. The server 22 must be able to execute the application 10 or locate a secondary server, not shown, on the network to execute it. In the latter case, the server 22 must send the application 10 to the secondary server and forward the request from the requesting client 20.

Figure 3:
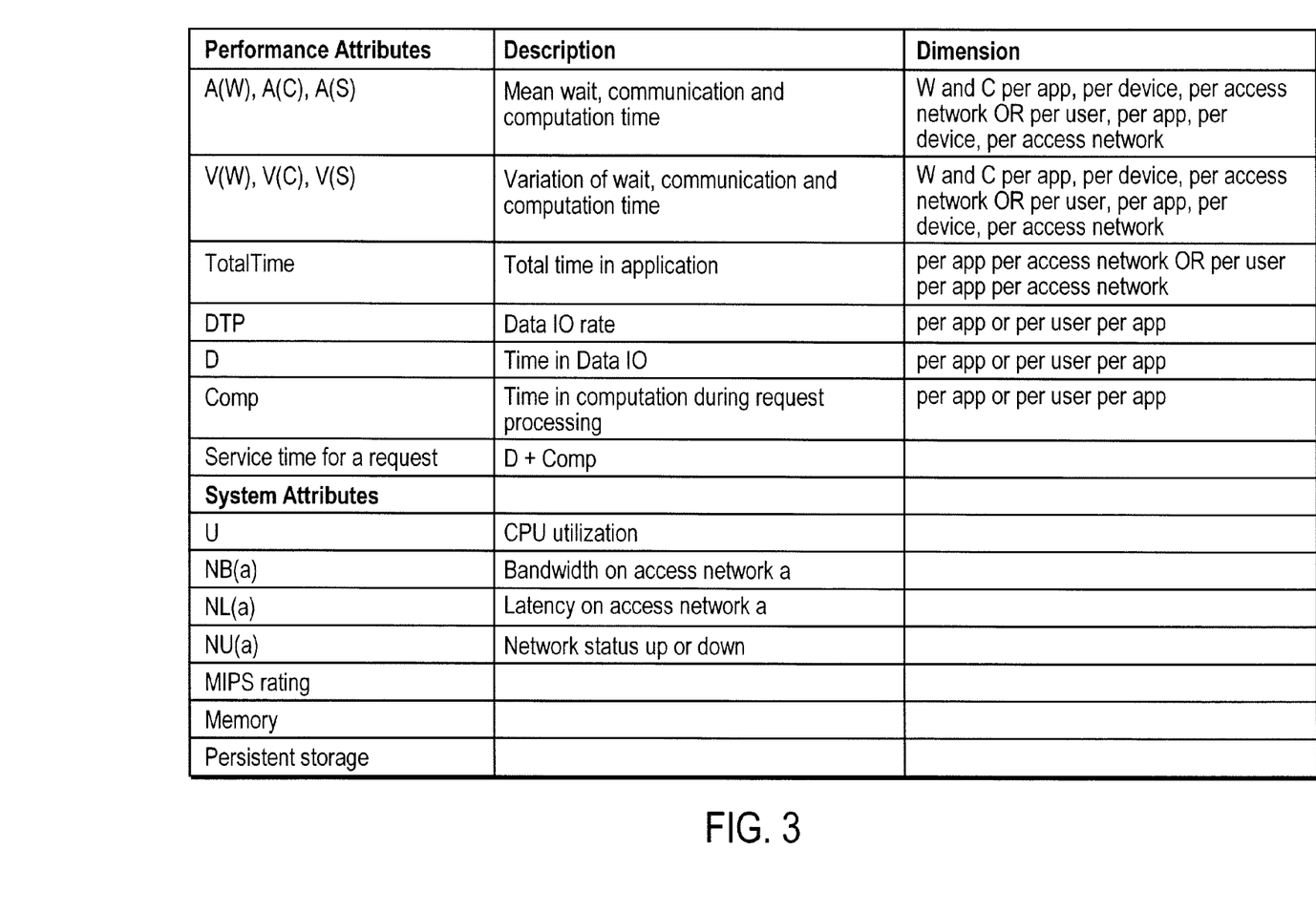
FIG. 3 is a table summarizing load balancing parameters according to the present invention, including the performance attributes and system attributes for a mobile application.

In order to load balance an application 10 according to the present invention, a mobile application engine 12 on a device can utilize a set of application attributes 14 comprising performance attributes 16 and system attributes 18, which are summarized in FIG. 3 and described in more detail below.

2. Application Performance Attributes

The application attributes 14 used to load balance an application 10 include a set of performance attributes 16 that characterize the application based on two criteria: 1) how interactive the application is, and 2) how computationally and data intensive the application is. Intuitively, developers want to provide the system with the ability to move interactive applications closer to the user, to move data intensive applications closer to the source of the data, and to allow a computationally intensive application to run on more powerful devices such as server class machines.

2.1 Characterizing Application Interactions

In particular, users wait for events when they interact with a client device 20 and request information from an application 10, for example when they post web page forms and click on URLs for information. These actions, including the act of filling in a form and waiting for a response and the act of clicking on a link and getting a page, are referred to as user interface events. When the application 10 runs on the client device 20, all of the wait time W is spent in the application. If the application 10 is executing remotely from the client device 20 on a server 22, part of the wait time W is spent communicating with the requesting client 20, communication time C, while the remainder of the wait time is spent on the server 22 in the application itself for processing of the client request, server computation time S.

In order to load balance an application 10 according to the present invention, the application engine 12 measures the following performance attributes 16 of the application for each form and URL sending a request to it: the mean and variance of the wait time W, the server computation time S and the communication time C.

For example, an HTML based client device 20 can intercept all "gets" and "posts" from the browser on the client to an application 10 on a server device 22. When a "get" or "post" is performed, a first timestamp T1 is taken. When the "get" or "post" returns and the reply generated by the application is displayed on the browser, a second timestamp T2 is taken. Also, the reply message from the application includes a parameter value indicative of the time spent in computation in the server S. Accordingly, the following calculations can be made:

$W=T2-T1$; and $W=S+C$, where

S=Server computation time;
C=Communication time;
W=Wait time;
T1=First time stamp; and
T2=Second time stamp.

The server 22 maintains a running average for the mean and variance of the server computation time, wait time and communication time, denoted by A(S), A(C), A(W), and V(S), V(C), and V(W) respectively. In addition, a running average for the mean and variance of the W and C parameters are calculated for each access network 28 used to communicate between the requesting client 20 and the server 22.

If the C and S parameters are continuous random variables, then the following relationships can be assumed:

$A(W)=A(C)+A(S)$; and $V(W)=V(C)+V(S)+Cov(V,S)$, where

Statistical Covariance for V and S=Cov(V,S).

Moreover, if V and S are statistically independent variables, then the following relationship holds:

$V(W)=V(C)+V(S)$

Therefore, a load balancing scheme can improve a user's perception of the performance of the application 10 by reducing A(C) and V(C).

For example, a framework for an algorithm to implement the application provisioning optimization could determine whether the wait time W for an application 10 is unacceptable by verifying if A(W) is greater than a predetermined threshold value. Also, it could determine whether the communication time C is having an appreciable impact on the wait time W by verifying that A(C) is greater than the A(S). If W is unacceptable and C is appreciable, then the framework could attempt to relocate the application to another device. Otherwise, the application continues to run on the present device.

Likewise, an algorithm framework that could be used to implement the network switching optimization determines whether the mean wait time for an application 10 using a first access network A(W-network1) is greater than the mean wait time using a second access network A(W-network2). If so, the algorithm uses the second network, network2, for communication to and from the application.

Those skilled in the art will recognize that other optimization algorithms for load balancing an application 10 are possible using the performance attributes 16. The load balancing scheme provides the opportunity for an application designer to create different algorithms to improve user experience and optimize the perceived performance for user interface events.

2.1.1 Characterizing Server Computation Time and Data Access

As noted above, the total service time for an application 10 to generate a reply to a single request from a client is measured by the server computation time S. The application 10 may spend server computation time S performing internal calculations and also accessing external data files, such that:

$S=D+I$, where

S=Server computation time;
D=Time spent for data I/O; and
I=Time spent for internal calculations.

In order to obtain values indicative of the server computation time S, a timer on the server 22 is started when the server receives a request for the application 10 from a client 20. When the application 10 generates a reply in response to the request, the timer is stopped. The duration for the timer measures the server computation time S. The I/O libraries for the application engine 12 are instrumented to record the time spent in data I/O, D, and the data I/O rate, DTP. The time spent for internal calculations, I, can be calculated from the equation above.

A server 22 can also record the average total time for the application to run to completion, TotalTime, using a timer on the server. These parameters are made available to an application developers to refine the load balancing algorithms discussed in more detail below.

2.1.2 Performance Attribute Instrumentation

The following are an exemplary set of APIs for intercepting user interface and file I/O events of an application 10 using an application engine 12 based on the J2ME platform. These APIs require the following modifications to the libraries java.net, jave.io, and java.util.

The performance attributes 16 for measuring user interface events of an application 10, including the wait time W, the server computation time S and communication time C, are determined by modifying java.net to intercepts all http requests. The following method is used to collect information on HTML based forms and URL processing, as described above:

---
void recordEvent( EventType et, Event e, TimeStamp t)
---

Each request/reply pair with a form is recorded and all the events in the form are counted using this method.

Additionally, the following method for data file read and writes is provided:

---
void _recordFileIO(AccessType type, int data, Timestamp time)
---

The data type for the parameter AccessType can be either read or write type. This method writes the measured performance attributes to a file.

2.2 System Attributes

The load balancing optimizations use system attributes 18 as well as performance attributes 16 for load balancing and network switching decisions. The system attributes 18 relate generally to the resources and processing power of the client and server devices 20 and 22 considered by the load balancing optimizations. In particular, as shown in FIG. 3, the following system attributes 18 are recorded for a particular device: the MIPS rating, mean and variance of CPU utilization, the size of memory and persistent storage, and the mean and variance of network latency and bandwidth for each network type available at the device.

2.2.1 System Attributes through Instrumentation

In order to measure the system attributes, a new library for a J2ME based application engine 12, java.sys.perf, makes available the following methods:

---
void System_cpu_util(Util U)
---

This method reads /dev/kem on UNIX to get CPU utilization information on UNIX systems. Those skilled in the art will recognize that similar calls exist on other operating systems.

---
void System_network_bandwidth (bandwidth b, accessnetwork a)
---

This method determines network bandwidth between a client 20 and a server 22 using access network 38 "a". The bandwidth is calculated by sending a packet of known size S to the server of size, getting the same size packet back, and then dividing the packet size S by the time it took to get the packet. This computation preferably is performed in the operating system for greater accuracy.

---
Void sys_network_load_latency(accessnetwork a, latency l)
---

This method uses Internet Control Message Protocol (ICMP) to determine network latency for access network 38 "a". A client 20 periodically sends an ICMP packet to a server 22 and uses the returned values to keep an average value for network latency over time. A system administrator can set the frequency with which this operation is performed.

---
Void Network_uptime(Netuptime nu, accesslink a)
---

This method determines the percentage of time that a network connection between a client 20 and a server 22 over access network 38 "a" is up. If an ICMP packet returns, then the system assumes that the network is up, otherwise it is down.

3. Collection and Dissemination of Application Attributes

In order to make load balancing decisions, the measured application attributes 14 must be made available to load balancing algorithms. The application provisioning optimization is run from the server 22. The network switching optimization can be run from the server 22 and the client 20. There are a variety of ways the client 20 and the server 22 can dynamically profile the application attributes 14.

For example, load balancing algorithms at the server 22 can obtain the system attributes 18 for a requesting client 20 from the request messages sent by the client. The server 22 can store its own system attributes 18 and make them available to load balancing algorithms at the server.

The client 20 can store measured values for A(W), A(C), A(S), V(W), V(C) and V(S) locally for each application 10 that runs on the client. In addition, a client device 20 may have a plurality of network interfaces corresponding to access networks 38. During think times T, a module on the client 20 may collect information on A(C) on the different access networks 38. This operation preferably is performed in an energy conserving fashion and with care not to overload the battery for the client 20. A(W) can be collected for each access network 38 by adding A(S) and V(C) for the application 10 across each corresponding network interface. Each of the measured A(W) values can be stored in a vector, which is used for application provisioning and network switching decisions.

Alternatively, a client 20 may collect information on A(C) from other clients on a common network that are using the same base stations or access points for communicating with the server 22. W, C and S can be measured per application or per user per application and stored in a cache on the client 20. The client cache can be synchronized with other clients, for example, through the server 22. It is assumed that the server 22 knows which clients share the same access point or base station. The server 22 will aggregate information for all the clients that share the same base station. The cached information for each client is then sent to the server 22 periodically at a frequency that is set by a system administrator. The server 22 aggregates the data and sends this information plus a smoothing interval to the client 20 when the client requests it. The smoothing interval is a predetermined value indicative of the time that must pass between successive load balancing optimizations.

The cache on the client 20 can also be synchronized directly between clients. In this case, each client broadcasts the cached information to other clients through an ad-hoc network such as Bluetooth, IRDA or 802.11b. Such a broadcast messages do not have to propagate through the network for communicating between the client 20 and the server 22. Instead, the clients individually aggregate data. A smoothing interval may be fixed by the system administrator or the clients can employ a distributed consensus algorithm to come to an agreed upon smoothing interval.

A server 22 can measure values for the performance attributes 16 for an application 10, including A(S), A(C), A(W), and V(S), V(C), and V(W), whenever the application is run on the server. A system administrator can select the number of times that an application 10 must run, for example ten iterations, before there is enough measured data about the performance attributes 16 to accurately use their dynamic profiles for load balancing.

3.1 Collecting Modes

Measured performance attribute 16 for an application 10 may be collected per user or per user per application or per user per application per device. If a device measures and stores performance attributes per application, a load balancing algorithm may use this information independent of the user. In addition, a device may measure and store performance attributes per user per application to allow load balancing algorithms to be tuned to the profiles of different users.

It may be desired to minimize the overhead associated with the mechanism for recording events. Accordingly, the collecting of performance attributes 16 and system attributes 18 should be non obtrusive from a memory and processing perspective. Since the memory requirements for saving the data for each of the application attributes are relatively minimal, writing this data to memory and reading the system clock should be non obtrusive. For example, assuming that user interface events occur from about 500 milliseconds to about one second, a Java based implementation of the load balancing optimizations that supports a system clock with about 1 millisecond granularity would allow for the measurement of user interface events with negligible overhead.

4. Load Balancing Algorithms

Two optimizations for load balancing an application based on its application attributes 14 include application provisioning and network switching. Specifically, when a client 20 requests an application 10 from a server 22, the application provisioning optimization can decide where to run the application 10 and the network switching optimization can decide which access network 28 to use for communication. Likewise, during runtime, the application provisioning optimization can relocate the application 10 and the network switching optimization can switch access networks 28 to improve user perceived performance.

4.1 Application Provisioning Optimizations

Figure 4:
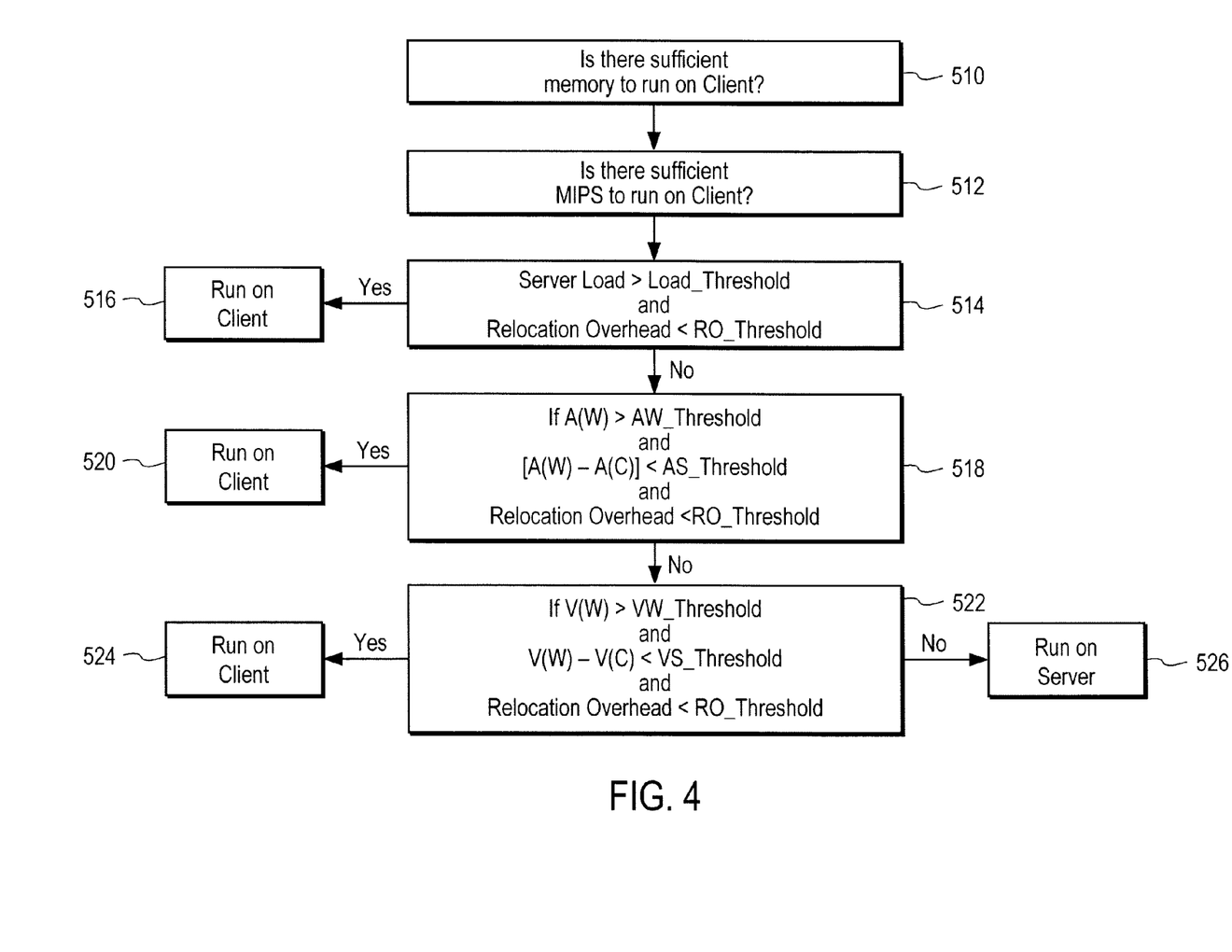
FIG. 4 is a flowchart showing details of an application provisioning optimization for load balancing a mobile application according to the present invention.

Referring next to FIG. 4, an example of an implementation of an application provisioning optimization is shown using a decision tree. This application provisioning algorithm is run from the server 22 and is equally applicable at load time and runtime of an application 10.

The application provisioning algorithm is based on mean wait times W, including mean communication times C and server computation times S, of an application. By moving the application to a requesting client device, it is possible to reduce the communication time C to about zero. First, the algorithm determines if the client requesting content from the application has sufficient memory to run the application using information about the client obtained from the request in step 10. Likewise, the algorithm determines if there the client has sufficient processing power, as measured by its MIPS rating, to run the application in step 12.

Next, the algorithm determines whether the computation load on the server, as measured by its CPU utilization, is greater than a predetermined Load_threshold value in step 14. Also, it determines whether the relocation overhead associated with moving the application from the server to the client is less than a predetermined RO_threshold value in step 14. The relocation overhead can be calculated based on the size of the application using a relationship set by the system administrator. If both conditions are met, then the algorithm instructs the server to move the application to the client for execution thereon in step 16. This sequence helps improve the perceived performance of the application when the server becomes too busy to timely process the application by moving the application on the client.

Otherwise, the algorithm determines whether the mean wait time for the application is greater than a predetermined AW_threshold value in step 18. If this condition is met and the mean server computation time, as measured by difference between the mean wait time and the mean communication time, is less than a predetermined AS_threshold value and the relocation overhead is less than the predetermined RO_threshold value in step 18, the algorithm instructs the server to move the application to the client for execution thereon in step 20. This step helps improve the perceived performance of the application when the wait times for user interface events of the application are too great by relocating the application to the client as long as the server computation time following the move is not too great.

Alternatively, the algorithm may determine to relocate the application if the mean wait time is greater than a predetermined threshold value and the mean communication time is greater than the mean server computation time.

Likewise, the algorithm determines whether the variance wait time for the application is greater than a predetermined VW_threshold value in step 22. If this condition is met and the variance server computation time, as measured by difference between the variance wait time and the variance communication time, is less than a predetermined VS_threshold value and the relocation overhead is less than the predetermined RO_threshold value in step 22, the algorithm instructs the server to move the application to the client for execution thereon in step 24. This step helps improve the perceived performance of the application when the wait times for user interface events of the application are too great by relocating the application to the client as long as the server computation time following the move is not too great. Otherwise, the application is run on the server in step 26.

Alternatively, the application provisioning algorithm can discount A(S) in its decision making if A(S) is much smaller then A(C). Otherwise, if S is about the same as C, then a scaling factor, SF, can be used to estimate A(S) on the device. The SF is the ration of the SpecInt on the server divided by the SpecInt on the device, where SpecInt is a known benchmark for comparing processors speeds.

Those skilled in the art will recognize that other implementations for the application provisioning algorithm are possible using the wait times for an application. For example, other algorithms that omit the step of comparing mean and variance of the wait time are possible.

4.1.1 Application Provisioning at Request Time

When a server 22 receives a request from a client device 20 for an application 10, the request has the following structure:

URI
Device MIPS
Mean and variance of CPU utilization, Available Device Memory and persistent storage smoothed over a time period
{Performance Attributes, Data Size for Application}

The performance attributes 16 of the application 10 are kept in a file on the client 20 and are indexed by an application URI, and optionally by the user.

The server 22 then looks into its own performance database and retrieves the following data:

---
Mean and Variance of CPU Utilization for Server
Mean and Variance of Network Bandwidth and Latency for Each Access Link Attached to Server
{Performance Attributes, Data Size for Application}

---

The application provisioning algorithm can choose the device the application is to run on using the application attributes obtained from the client 20 or the server 22 or a combination thereof.

If a server 22 is attempting to load balance an application 10 for the first time or the performance attributes 16 for an application 10 are not fresh, the server can 1) obtain values for the performance attributes from a recent run of the application on another device in the network or 2) use cached values of performance attributes for a similar application on a similar device and network that the server has stored. The freshness criterion is set by the system administrator.

4.1.2 Application Provisioning at Runtime

In order to load balance a currently running application 10, the requesting client 20 determines if its performance has been degraded beyond a certain threshold and then sends this information to the server 22. Specifically, while a client 20 is accessing an application 10 that is executing on a server 22, the client monitors mean and variance wait times for all user interface events from the client. If either A(W) or V(W) reaches a predetermined threshold, then the client 20 sends a message to the server 22 containing the following information:

---
MIPS Rating for Client
Mean and Variance of CPU Utilization for Client
Available Device Memory and Persistent Storage for Client (smoothed over a time period)
{Performance Attributes}

---

The server 22 then determines if the application 10 should run instead on the client 20. If so, the application 10 and its performance attributes 16 are moved to the client 20. The server 22 may save the state of the application 10 before it is shutdown and relocated to allow the client 20 to resume its execution using the saved state.

4.2 Network Switching Optimizations

Figure 5:
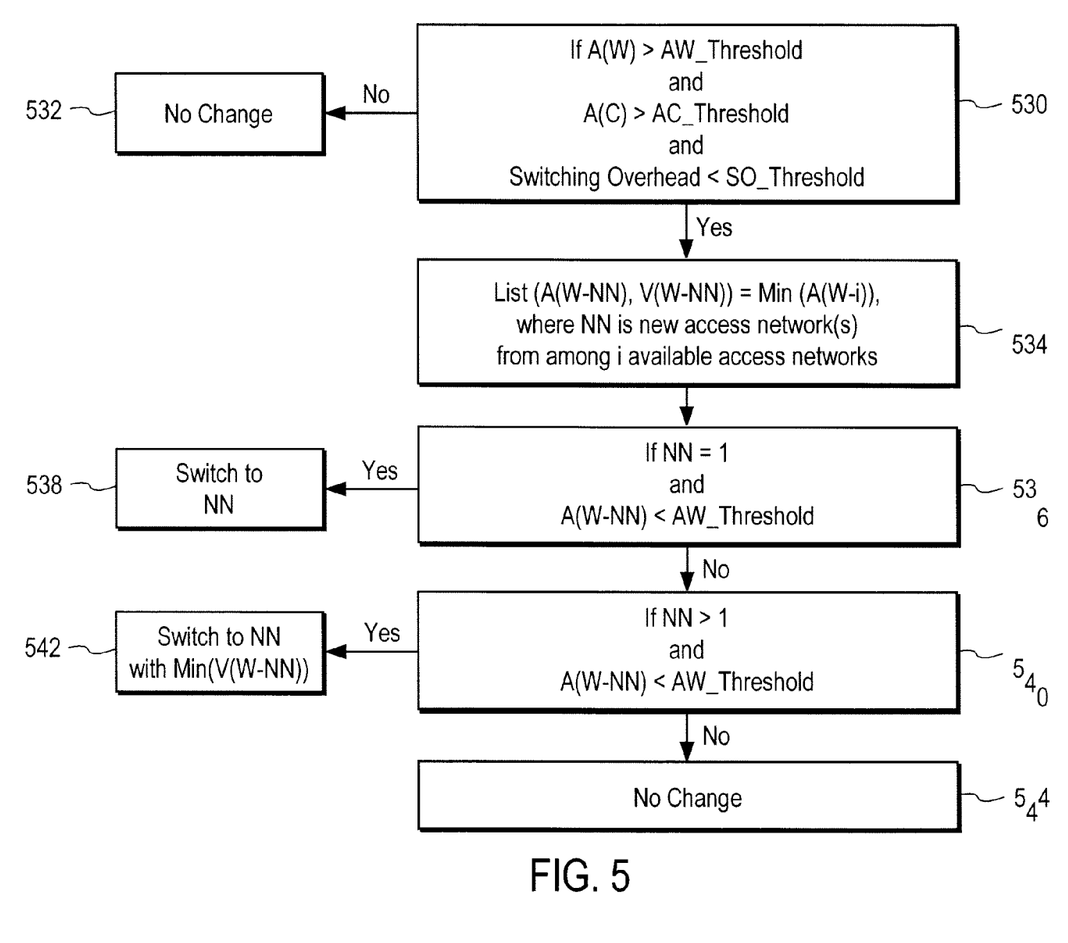
FIG. 5 is a flowchart showing details of the network switching optimization f for load balancing a mobile application according to the present invention.

An implementation of a network switching algorithm is shown using a decision tree in FIG. 5. This network switching algorithm can be run from the server 22 and the client 20. Assuming that a client 20 and server 22 can communicate over a plurality of access networks 28, the network switching algorithm can switch among access networks 28 in order to the lower the mean and variance wait times for an application 10. A user can install various network switching algorithms on the client 20 from the server 22 or from another network device.

First, in step 30, the network switching algorithm determines whether the mean wait time for the application is greater than a predetermined AW_threshold value and if the mean communication time for the application is greater than a predetermined AC_threshold value using the current access network. If these conditions are met and the network switching overhead is less than the predetermined SO_threshold value, the network switching algorithm will attempt to switch access networks in steps 34-42. The network switching overhead can be calculated based on the size of the application using a relationship set by the system administrator. Otherwise, the current access network remains in use, in step 32.

Next, in step 34, the algorithm calculates the mean and variance wait times for the application across all available access networks. It then identifies the minimum mean wait time for the group of available access networks. If the minimum mean wait time is less than a predetermined AW_threshold value and only one access network NN matches it in step 36, then the algorithm instructs the device to switch to the access network NN in step 38.

If the minimum mean wait time is less than a predetermined mean threshold value and two or more access networks match it in step 40, then the algorithm selects the access network from among the identified group having the lowest variance wait time in step 42. Otherwise, if none of these conditions for switching access networks is met, the current access network remains in use in step 42.

Alternatively, the algorithm can switch access networks if it finds an access network whose mean wait time is less than the mean wait time for the currently used access network by a predetermined threshold value, T-meanwait. If the mean wait times are approximately the same on all access networks, but there exists an access network where the variance of the wait time is less than the variance wait time for the currently used network by a predetermined threshold, T-varianceMeanwait, then the algorithm can switch to this network.

5. Utilization Smoothing

Utilization smoothing is a technique that can prevent thrashing during load balancing. In particular, the network switching optimization allows only N network switching events per time period T. The values for these parameters can vary with individual implementations of the load balancing algorithms and can be set by a system administrator of a network.

The following algorithm for a client 20 illustratively determines the smoothing interval for the network switching algorithm. Each client 20 has a list of switches made in the time period T by each of its peers. The peer group is created dynamically or can be requested from the server 22. Each time a client 20 switches networks it broadcasts that information to its neighbors using an adhoc network. The switching algorithm is run only if the number of switching events in time period T is less than N. However, when the link itself fails, the algorithm may be configured to switch networks immediately. Alternatively, a server 22 may keep a list of switches made recently and send this information to each client 20 requesting updates of application attributes.

6. Load Balancing Applications

The load balancing optimizations according to the present invention can be used in various mobile application environments. For example, in one mobile application environment, developers create mobile applications ("Mervlets") that are capable of creating dynamic web pages for mobile computing devices. A Mervlet comprises uninterpreted code that includes both user interface logic for creating a web page and application logic for generating dynamic content for the page. A Mervlet can further comprise local static data and can access data files, such as ASCII text files.

Figure 6:
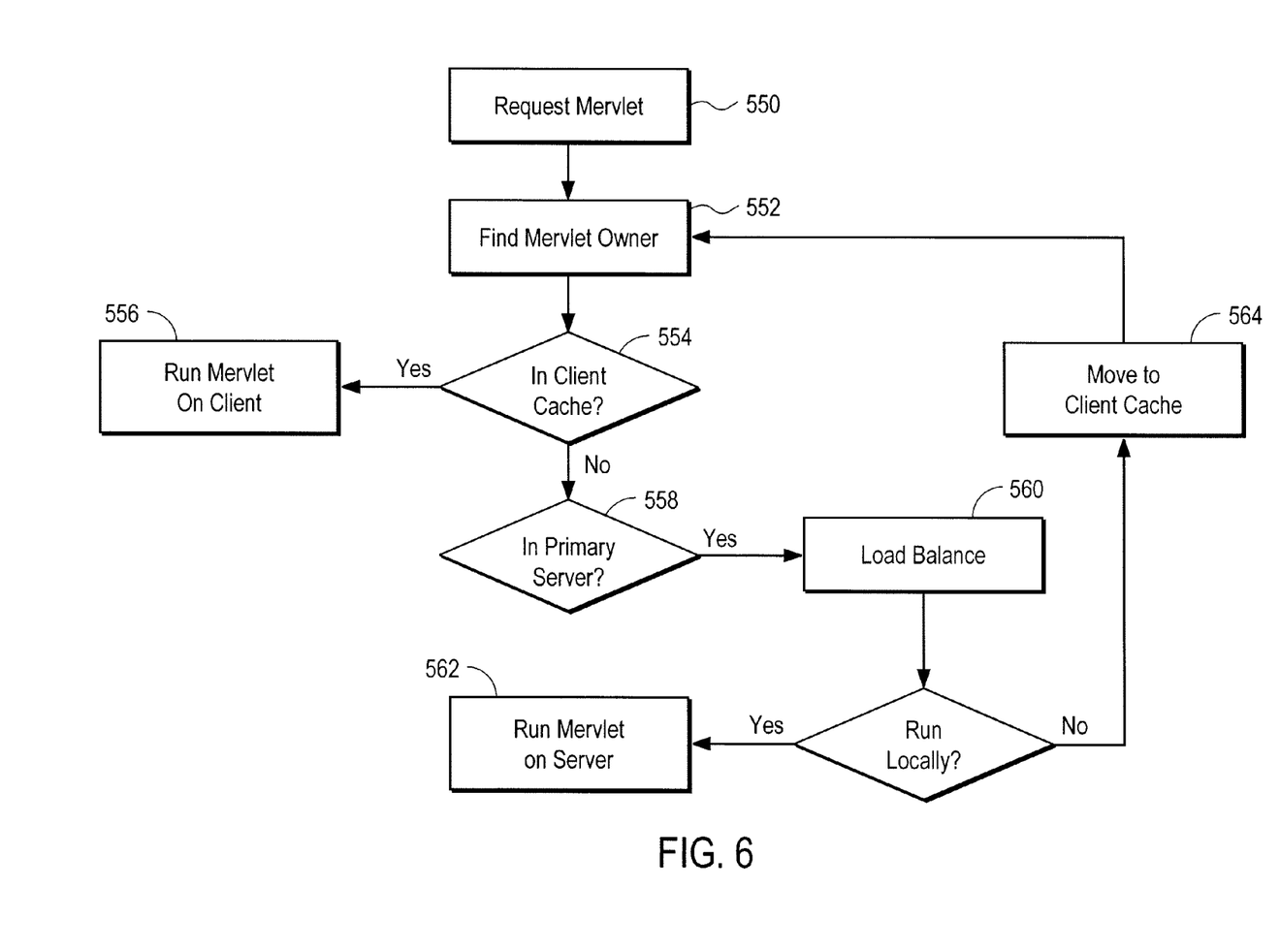
FIG. 6 is a flow chart showing the details of the operation of an illustrative mobile application environment for load balancing a mobile application according to the present invention.

In operation, as shown in FIG. 6, a mobile device or user client device forming part of a communications network generates a request for a Mervlet in step 50. The client can display information using a web browser, such as Internet Explorer and Pocket Internet Explorer from Microsoft Corp. and Netscape Navigator from Netscape Communications Corp. The client generates a request for a Mervlet using a Uniform Resource Identifier ("URI"). The URI encodes the name and address of an object, including a Mervlet, in a registered name space on the network to allow access to the object using an Internet access protocol. The requesting client may be able to execute the Mervlet locally or obtain content from the Mervlet when it is executing remotely.

The client locates a device on the network that stores the Mervlet in step 52. The device may be a remote server or the client itself. The requesting client first checks to see if the Mervlet is stored in a local cache on the device in step 54. If it is, then the Mervlet is executed there and then in step 56.

Otherwise, the requesting client communicates with the server to get "access" to the requested Mervlet in step 58. The client can locate the server that stores the Mervlet using existing resource discovery techniques, such as JINI from Sun Microsystems. The server can then invoke a load balancing policy according to the present invention on the Mervlet in step 60 to optimize the user perceived performance of the Mervlet. For example, the server may decide to run the Mervlet locally (step 62) or to relocate it to the requesting client (step 24). In some cases, the client may make an explicit request to run the Mervlet at its site. However, the server can ignore that request. If the Mervlet is executed on the server in step 62, the result is transmitted back to the client via a messaging system of the Mervlet application environment.

The server can determine whether to run the Mervlet locally or on the requesting client based on the Mervlet's application attributes. For example, the server may determine to run the Mervlet on the client if the Mervlet is highly user interactive, for example a gaming application, and the client has sufficient hardware resources to execute the Mervlet. On the other hand, if the Mervlet is data or computationally intensive rather than interactive, for example a personalization application, then the server may determine to run the Mervlet itself.

If the server determines that the requested Mervlet should run on the requesting client, then the Mervlet is marshaled and sent to the client. In order to relocate the Mervlet, the server packages it into an Mervlet application archive file. The archive file preferably comprises 1) the Mervlet and any associated tag libraries, 2) the security context attributes and application attributes for the Mervlet, 3) any data files associated with the Mervlet, and 4) the archive file manifest describing the contents of the file. Therefore, the archive file has all the information necessary for the client to execute the application locally. The archive file may be compressed, hashed and then signed. A downloader may uncompress and verify that the content has not been corrupted and verify the signature.

In another application environment, developers create application programs ("Aglets") that can migrate across a network from one machine to another. Aglets have a method "dispatch(url)" that allows an Aglet to send itself to another machine specified in the URL. Using the load balancing optimizations according to the present invention, all the machines on the Aglet system have lists of mean and variance wait times stored in a system database. An Aglet has access to this information through the Aglet system libraries and could itself write any policy to select a machine to run on. For example, the following stylized code sequence could be implemented on the Aglet system for load balancing:

```
DispatchPolicy( )
{
If (A(W) > Threshold ) then
        Dispatch(URL); // where A(W) is the average mean
        wait time for
    the Aglet and URL is the URL of the Aglet runtime on
    the browser machine
}
```

Using this methodology, an Aglet providing content to a remote browser or other application could either 1) remain on the current machine or 2) move itself to the same machine as the browser.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A method for load balancing an application among a plurality of computing devices communicably coupled with at least one access network for communication between the devices, the method comprising:

issuing a request, from a client device communicably coupled with said at least one access network, for said application;

monitoring a set of application attributes while executing said application, including measuring the set of application attributes associated with said application including at least one performance attribute for characterizing user perceived performance of said application based on one or more user interface events associated with a user interface of the application;

provisioning execution of said application on one of said client device and a server device in response to said request based on said set of application attributes, including determining whether to relocate said application from said server device to said client device based on said monitored set of application attributes while executing said application; and executing said application on said one of said client and server devices based on provisioning execution of said application.

2. The method of claim 1 further comprising selecting a first access network for communication between said server device and client device based on said set of application attributes.

3. The method of claim 2 further comprising: monitoring said set of application attributes while executing said application; and determining whether to switch to a second access network for communication between said server device and client device based on said set of application attributes being monitored while executing said application.

4. The method of claim 1 wherein said at least one performance attribute comprises at least one parameter relating to latency for user interface events for said application, said latency defined based on at least one of server computation times and communication times.

5. The method of claim 4 wherein said at least one parameter relating to wait times comprises at least one of a mean of said wait times and a variance of said wait times.

6. The method of claim 5 wherein said server computation times comprise internal calculation times and data I/O times.

7. The method of claim 5 wherein said at least one performance attribute further comprises a total time for said application to run to completion.

8. The method of claim 1 wherein said at least one performance attribute is measured per application.

9. The method of claim 1 wherein said at least one performance attribute is measured per application per device.

10. The method of claim 1 wherein said at least one performance attribute is measured per application per device per user.

11. The method of claim 1 wherein said at least one performance attribute is measured per application per device per user per access network.

12. The method of claim 1 wherein said set of application attributes further includes at least one system attribute for characterizing performance of at least one of said client device, said server device and said at least one access network.

13. The method of claim 12 wherein the at least one system attribute comprises at least one of a parameter relating to a measure of utilization of a processor of said client device, a MIPS rating of said processor, memory size of said client device and an amount of persistent storage for said client device.

14. The method of claim 12 wherein the at least one system attribute comprises at least one of a parameter relating to a measure of utilization of a processor of said server device, a MIPS rating of said processor, memory size of said server device and an amount of persistent storage for said server device.

15. The method of claim 12 wherein the at least one system attribute comprises at least one of network bandwidth of said at least one access network, network latency of said at least one access network and network status of said at least one access network.

16. A system for load balancing an application being executed within at least one network, the system comprising one or more computer-readable storage media storing instructions which, when executed by one or more systems, cause the system to run a plurality of modules to load balance an application being executed within at least one network, the plurality of modules comprising:
 a plurality of execution modules communicably coupled with said at least one network to provide different execution environments for said application, the different execution environments includes at least one server and at least one client;
 at least one collection module coupled with said at least one network to monitor a set of application attributes while executing said application, the at least one collection module being operable to measure a set of application attributes associated with said application including at least one performance attribute for characterizing user perceived performance of said application based on one or more user interface events associated with a user interface of the application;
 at least one policy module coupled with said at least one network to determine a first execution module that satisfies at least one policy for determining an execution environment of said application based on said application attributes; and
 at least one program allocation module to allocate said application from a server to said first execution module, the first execution module being in a client.

17. The system of claim 16 further comprising at least one network allocation module to select an access network that satisfies at least one policy for determining a communication environment of said application based on said set of application attributes.

18. The system of claim 17 wherein said at least one performance attribute comprises at least one parameter relating to wait times for user interface events for said application, said wait times including at least one of server computation times and communication times.

19. The system of claim 18 wherein said at least one parameter relating to wait times comprises at least one of a mean of said wait times and a variance of said wait times.

20. The system of claim 19 wherein said server computation times comprise internal calculation times and data I/O times.

21. The system of claim 20 wherein said at least one performance attribute further comprises a total time for said application to run to completion.

22. The system of claim 16 wherein said at least one performance attribute is measured per application.

23. The system of claim 16 wherein said at least one performance attribute is measured per application per device.

24. The system of claim 16 wherein said at least one performance attribute is measured per application per device per user.

25. The system of claim 16 wherein said at least one performance attribute is measured per application per device per user per access network.

26. The system of claim 16 wherein said set of application attributes further includes at least one system attribute for characterizing performance of at least one of said client device, said server device and said at least one access network.

27. The system of claim 26 wherein the at least one system attribute comprises at least one of a parameter relating to a measure of utilization of a processor of said client device, a MIPS rating of said processor, memory size of said client device and an amount of persistent storage for said client device.

28. The system of claim 26 wherein the at least one system attribute comprises at least one of a parameter relating to a measure of utilization of a processor of said server device, a MIPS rating of said processor, memory size of said server device and an amount of persistent storage for said server device.

29. The system of claim 26 wherein the at least one system attribute comprises at least one of network bandwidth of said at least one access network, network latency of said at least one access network and network status of said at least one access network.

30. A system for load balancing an application among a plurality of computing devices communicably coupled with at least one access network for communication between the devices, the system comprising:
 a client device communicably coupled with said at least one access network;
 a server device;
 means for issuing a request, from the client device communicably coupled with said at least one access network, for said application;
 monitoring a set of application attributes while executing said application, including means for measuring the set of application attributes including at least one performance attribute for characterizing user perceived performance of said application based on one or more user interface events associated with a user interface of the application;

means for provisioning execution of said application on one of said server device and the client device in response to said request based on said set of application attributes, including means for determining whether to relocate said application from said server device to said client device during execution based on said monitored set of application attributes; and means for executing said application on said one of said client and server devices provisioning execution of said application.

31. The system of claim 30 further comprising means for selecting a first access network based on said set of application attributes to communicate between said server device and client device.

32. The system of claim 31 further comprising: means for monitoring said set of application attributes during execution of said application; and means for determining whether to switch to a second access network during execution of said application based on said monitored set of application attributes to communicate between said server device and client device.

33. A method comprising:
monitoring a set of one or more application attributes associated with a mobile application program in a network comprising a plurality of nodes and an access network, the plurality of nodes including a mobile device, at least one of the application attributes characterizing user perceived performance of the application based on one or more user interface events associated with a user interface of the application; and load balancing execution of the mobile application program based on the set of application attributes and a storage location of the mobile application program, wherein load balancing the application comprises provisioning execution of the mobile application program on one of the plurality of nodes to achieve a level of user perceived performance of the mobile application program, wherein provisioning execution of the mobile application program comprises sending the mobile application program to a client device requesting the mobile application program if the set of application attributes is in a first state, and allowing a first server device that is storing the mobile application program to execute the mobile application program if the set of application attributes is in a second state, and executing the application on the one node.

34. The method defined in claim 33 wherein the set of application attributes includes an attribute indicative of user perceived performance of the mobile application program.

35. The method defined in claim 33 wherein provisioning execution of the mobile application program comprises sending the mobile application program to a second server device for execution thereon if the set of application attributes is in a third state.

36. The method defined in claim 33 wherein the set of attributes characterizes one or more of interactivity of the application program and computation and data intensity of application program.

37. The method defined in claim 36 wherein the interactivity of the application program is based on interactions between previous invocations of the application program and a client device, including wait times associated with interactions with the application program.

38. The method defined in claim 33 wherein provision execution of the application program comprises a server determining whether to run the application program locally or on the mobile device based on one or more of the following:
the memory and processing capabilities of the mobile device and server nodes,
the load on each of the two mobile device and server nodes and network bandwidth and latency, and
the set of attributes related to the performance of the application program.

39. The method defined in claim 38 wherein the server determining whether to run the application program locally or on the mobile device comprises the server determining to run the application program on the mobile device if the application program is user-interactive and the mobile device has sufficient hardware resources to execute the application program.

40. The method defined in claim 38 wherein the server determining whether to run the application program locally or on the mobile device comprises the server determining to run the application program on the server if the application program is computationally intensive.

41. The method defined in claim 33 further comprising:
locating the application program in response to a request from the mobile device on a network,
creating an instance of the application program;
loading the instance of the application program into a memory.

42. The method defined in claim 33 further comprising the mobile device sending a request for the application program across a network, the request including an identifier to identify the application program, the processor utilization on the mobile device, the MIPS rating of the mobile device, the available memory and the persistent storage on the mobile device and any performance attributes of the application program if available.

43. An article of manufacture having one or more computer-readable storage media storing instructions thereon which, when executed by one or more systems, cause the one or more systems to perform a method comprising:
monitoring a set of one or more application attributes associated with a mobile application program in a network comprising a plurality of nodes and an access network, the plurality of nodes including a mobile device and a first server device, at least one of the application attributes characterizing user perceived performance of the application based on one or more user interface events associated with a user interface of the application; and load balancing execution of the mobile application program based on the set of application attributes and a storage location of the mobile application program, wherein load balancing the application comprises
provisioning execution of the mobile application program on one of the plurality of nodes to achieve a level of user perceived performance of the mobile application program, wherein provisioning execution of the mobile application program comprises sending the mobile application program to a mobile device requesting the mobile application program if the set of application attributes is in a first state, and allowing the first server device that is storing the mobile application program to execute the mobile application program if the set of application attributes is in a second state, and executing the application on the one node.

* * * * *